(12) United States Patent
Hemmerlin

(10) Patent No.: US 9,677,594 B1
(45) Date of Patent: *Jun. 13, 2017

(54) GENERAL PURPOSE HOLDER

(71) Applicant: Ralph James Hemmerlin, Parker Prairie, MN (US)

(72) Inventor: Ralph James Hemmerlin, Parker Prairie, MN (US)

( * ) Notice: Subject to any disclaimer, the term of this patent is extended or adjusted under 35 U.S.C. 154(b) by 254 days.

This patent is subject to a terminal disclaimer.

(21) Appl. No.: 14/529,770

(22) Filed: Oct. 31, 2014

Related U.S. Application Data

(63) Continuation-in-part of application No. 13/725,741, filed on Dec. 21, 2012, now Pat. No. 9,532,559.

(51) Int. Cl.
| | | |
|---|---|---|
| *A01K 97/10* | (2006.01) | |
| *F16M 11/06* | (2006.01) | |
| *F16M 13/02* | (2006.01) | |
| *F16B 35/00* | (2006.01) | |

(52) U.S. Cl.
CPC ............ *F16B 35/005* (2013.01); *A01K 97/10* (2013.01); *F16M 11/06* (2013.01); *F16M 13/02* (2013.01)

(58) Field of Classification Search
CPC ......... A01K 97/10; F16M 11/06; F16M 13/02
USPC ....... 43/21.2; 248/311.2, 511, 514, 520–521, 248/538–539
See application file for complete search history.

(56) References Cited

U.S. PATENT DOCUMENTS

| | | |
|---|---|---|
| 1,321,842 A | 11/1919 | Otto |
| 2,055,842 A | 9/1936 | Haislip |
| 2,540,584 A | 2/1951 | Jaycox |
| 3,077,327 A | 2/1963 | Batie et al. |
| 3,116,046 A | 12/1963 | Risdon |
| 3,370,820 A * | 2/1968 | Liss .................... A24F 19/0092 131/241 |
| 3,881,677 A * | 5/1975 | Ihlenfeld .................. A47C 7/62 248/224.51 |
| 4,071,219 A | 1/1978 | Seager |
| 4,763,435 A | 8/1988 | Deering |
| 4,819,903 A | 4/1989 | Jimenez |
| 4,835,896 A | 6/1989 | Bowen |
| 4,877,165 A | 10/1989 | Behrie |
| 4,878,642 A | 11/1989 | Kirby, Jr. |
| 4,901,970 A | 2/1990 | Moss et al. |
| 5,063,701 A | 11/1991 | Ottens |
| 5,295,650 A * | 3/1994 | Brandt ..................... A47C 7/68 108/26 |
| 5,325,620 A | 7/1994 | Reed et al. |
| 5,356,107 A | 10/1994 | Sinohniz |
| D371,595 S | 7/1996 | Pieper et al. |
| 5,533,295 A | 7/1996 | Hochberger |
| 5,557,876 A | 9/1996 | Parker |

(Continued)

*Primary Examiner* — David Parsley
(74) *Attorney, Agent, or Firm* — Berggren Law Offices, LLC; William R. Berggren; Stephen F. Wolf

(57) ABSTRACT

A flexible general purpose holder apparatus easily attached to and detached from supporting members with either a flick of a wrist or a fasting element such as a screw or mechanical fastener, and can be adjusted in an angle of up to 90 degrees in a stable manner about a line perpendicular to the length of the support member and in an angle of up to 90 degrees in a stable manner about a line that is perpendicular to the first line. The apparatus comprises a holding element, a connecting rod, a joining element, first attaching element, and an effective length.

19 Claims, 10 Drawing Sheets

(56) References Cited

U.S. PATENT DOCUMENTS

| | | | |
|---|---|---|---|
| 5,560,137 A | 10/1996 | Herring | |
| 5,823,496 A * | 10/1998 | Foley | A47G 23/0225 |
| | | | 248/156 |
| 5,865,124 A | 2/1999 | Wroe | |
| D408,885 S | 4/1999 | O'Neill | |
| 5,899,527 A | 5/1999 | Elvidge et al. | |
| 6,042,180 A | 3/2000 | Lombardi | |
| 6,409,131 B1 | 6/2002 | Bentley et al. | |
| 6,588,362 B1 | 7/2003 | Cope | |
| 6,601,813 B1 * | 8/2003 | Kager | A45D 20/12 |
| | | | 248/288.31 |
| D480,782 S | 10/2003 | DeBerry et al. | |
| 6,898,893 B1 | 5/2005 | Mukdaprakorn | |
| D507,817 S | 7/2005 | Mitchell | |
| 6,942,131 B2 * | 9/2005 | Trautman | B62J 11/00 |
| | | | 224/414 |
| 7,047,688 B2 | 5/2006 | Sandman, Jr. | |
| 7,309,054 B2 | 12/2007 | Slatter et al. | |
| 7,320,196 B2 | 1/2008 | Diederichs | |
| 7,395,777 B2 | 7/2008 | Trebbi | |
| 7,530,324 B2 * | 5/2009 | Salerno | A01K 97/10 |
| | | | 114/364 |
| 7,699,277 B2 * | 4/2010 | Bagnall | A01K 63/006 |
| | | | 119/230 |
| 7,765,732 B1 | 8/2010 | Canevari | |
| 7,793,904 B2 * | 9/2010 | Scarton | A47G 23/0225 |
| | | | 224/414 |

* cited by examiner

GENERAL PURPOSE HOLDER

FIELD OF THE INVENTION

This invention relates to holders and supports generally and to light weight rotatable holders and support brackets that can be quickly and easily attached to support members.

BACKGROUND OF THE INVENTION

There is a need for a general purpose holder that is flexible and easy to attach and detach from more secure structures that contain a pole or other support.

There has been a long-term need, particularly in the in the fishing and camping industry, for simple and easy to use general purpose holders. Such holders have been around for a long time. These devices generally are affixed to or designed in chairs or other support structures to hold common items such as cans or bottles that contain beverages. These holders generally have limited flexibility in changing of a position or orientation. Also, most that can be added to existing support structures are fix-mounted to surfaces with screws, held at a position, and are limited to specific items. Others are detachable and mounded with attaching devices such as, for example, set-screws. These devices require tools to attach and detach from a support. Both are time consuming to install, and have limited range of motion to accommodate the positions of various firmly positioned structures.

Some general purpose holders have been developed that do not require tools to attach or detach from support members. However, these holders lack flexibility in adjusting the orientation of the holder to the supporting member to achieve an optimum position. Users of general purpose holders frequently desire convenience, speed, and flexibility that are best achieved by flexibility in positioning the holder.

Other general purpose holders have been taught that can be fitted to hold a variety of objects such as IV bags and lights in medical settings. However, these holders lack the ability to rotate so as to easily achieve a desired orientation.

There still is a need for a general purpose holder that is flexible and easy to attach and detach from more secure structures that contain a pole.

SUMMARY OF THE INVENTION

I have invented a flexible general purpose holder apparatus easily attached to and detached from supporting members with either a flick of a wrist or a fasting element such as a screw or mechanical fastener, and can be adjusted in an angle of up to 90 degrees in a stable manner about a line perpendicular to the length of the support member and in an angle of up to 90 degrees in a stable manner about a line that is perpendicular to the first line. The apparatus comprises a holding element, a connecting rod, a joining element, first attaching element, and an effective length. The holding element is configured to hold various objects. The connecting rod has a length with a first longitudinal axis, a shaft with a first diameter, and a first end with an enlarged second diameter. It also has a second end adapted to be releasably affixed to the holding element in a stable rotatable manner about a second axis that is perpendicular to the first axis and passes through the point where the second end contacts the holding element. The joining element has a first end with a female threaded opening and a second end releasably and rotatably affixed to the first end of the connecting rod and having a hole that encompasses the first diameter of the connecting rod and not the enlarged second diameter of the first end of the connecting rod. The first attaching element comprises a head configured to affix to a support member, a body, and a male threaded end configured to screwably affix to the female threaded opening of the first end of the joining element and with a rotatable connection point comprising a release surface affixed to the male threaded end to permit stable rotation of the connecting rod about its first axis of up to 90 degrees. The effective length that extends from a point where the first end of the connecting rod enters the second end of the joining element to the point where the second end of the connecting rod contacts the holding element.

I have also invented a method of using an adjustable general purpose holder apparatus comprising at least five steps. The first step is providing a general purpose holder apparatus as described above. The second step is providing a support member. The third step is affixing the head to the support member. The fourth step is rotating the apparatus about the first axis and second axis to achieve a desired position of the holding element. The fifth step is using the holding element for its purpose of use by placing a desired object in the holder unless the holder already contains the object.

As used herein:

"Stable rotation" means the holder can be rotated up to 90 degrees about the axis of the cylinder and the position will remain stable under intended use.

"Support member" means a structure, typically tubular but may be with a polyhedral cross-section, that is stationary during use such as, for example, cylinders in a lawn chair or poles in a tent or ice-fishing house.

"Vertical adjustability" means the user has adjustability in a plane parallel to the support structure to achieve an optimum angle between the holding element and the clamping element that may be attached to supporting members having various orientations from horizontal.

"Without need of tools" means the apparatus can be attached, detached and orientation by hand without the use of tools.

My adjustable general purpose holder has the advantages of speed, flexibility, and simplicity. The apparatus can by quickly mounted to any of the support rods of structures such as, for example, a folding chair or supports in a tent, by placing the hook end of the snap clamp over the pole. It is adjustable because the first end of the attaching element can be rotated about both the axis that is perpendicular to the support and the axis that is tangential support surface where it contacts the first axis. Rotation about each axis is both at least 90 degrees and stable under intended use. Various holder embodiments are able to stably hold in use a variety of objects, such as, for example, a light, a beverage can or bottle, a coat or lantern, and a rattle reel. Some embodiments may use a plate that is affixed to a support with such devices as screws or mechanical fasteners instead for long term use in a particular location of a support.

BRIEF DESCRIPTION OF THE DRAWINGS

One or more features or preferred forms of the invention are described in the accompanying drawings. The drawings are described briefly below.

DETAILED DESCRIPTION OF SOME EMBODIMENTS OF THE INVENTION

Figure 1A:
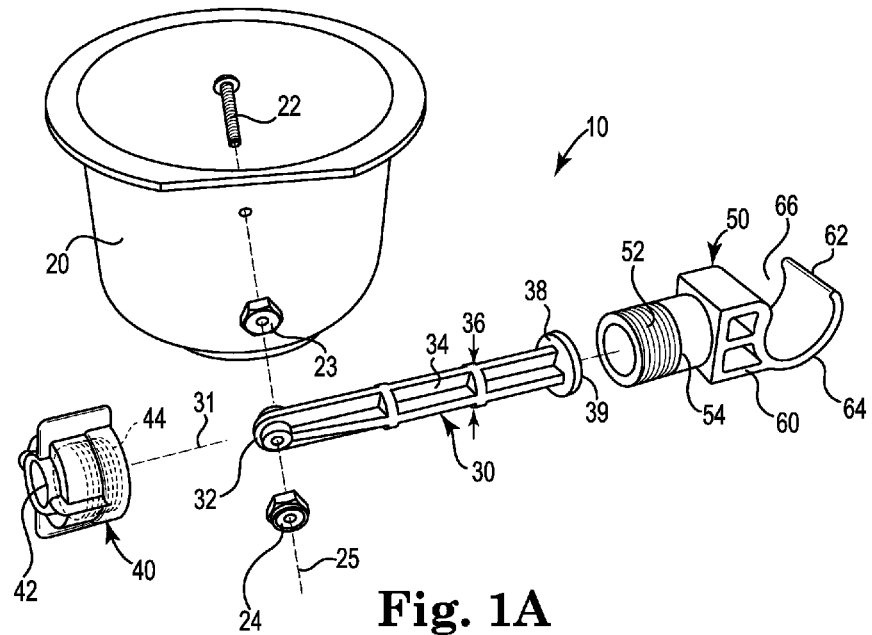
FIG. 1 is an illustration of one embodiment of the invention with a cup holder with (A) depicting an exploded perspective view and (B) depicting an assembled perspective view.

The present invention relates to a device for holding a variety of useful objects in a relaxing temporary setting such as camping of lounging outdoors. The invention uses a unique mounting arrangement that allows the general purpose holder to be removably mounted to a support member such as, but not limited to, a frame of a portable ice fishing shelter, a tent, a seat pedestal of a boat, or on a leg of a lawn chair, which keeps the objects from coming into contact with the ground, snow, ice, or water, and from loss, due to fish or animals.

Known general purpose holders, fishing rod holders, or lawn chairs with accessory holders that may have some relevance to the invention can be categorized into three groups. Group One comprises a fishing rod bracket/support/holder that is described for use on a chair, or is attachable to a support structure having a cylindrical shape but often is complex, sometimes requires multiple tools to attach and detach from a support and is not sufficiently flexible in orientation. None contains a snap clamp to attach the fishing rod holder to a support structure. No "vertical adjustability" means the user has little or no vertical adjustability in a plane parallel to the support structure to achieve an optimum angle between the holding element and the clamping element that may be affixed to supporting members having various orientations from horizontal. Representative references include the following. U.S. Pat. No. 1,321,842 teaches a cylinder with wire spring clamp for fastening the cylinder to a horizontal support where the wire clamp appears to provide weak support needing the fishing rod to rest on another surface and no vertical adjustability is available. U.S. Pat. No. 2,055,842 teaches a fishing rod holder attachable to a support with a rectangular C-clamp attachment fixture that appears not well suited for clamping against a curved surface and is vertically adjustable through complex screws and nuts requiring tools. U.S. Pat. No. 2,540,584 teaches a fishing rod holder designed to attach to a gunwale of a boat, has a complex attaching mechanism requiting tools and a rectangular C-clamp attachment fixture that appears not well suited for clamping against a curved surface. U.S. Pat. No. 3,116,046 teaches a one piece refreshment container holder clamping device that is attached to lawn chairs without any vertical adjustability. U.S. Pat. No. 4,071,219 teaches a substantially horizontal fishing rod holder that expends outward from a lawn chair but requires tools to install and detach and has a fixed position with no vertical adjustability. U.S. Pat. No. 4,819,903 teaches a simplified fishing rod holder that press-clamps onto vertical poles of a portable chair but has a fixed position with no vertical adjustability. U.S. Pat. No. 4,877,165 teaches a device that uses a screw and a clamp to attach device to a support and has a fixed position with no vertical adjustability. U.S. Pat. No. 4,878,642 teaches a fishing rod holder attached to a force fit clamp through a rotatable open cylindrical bore surface that is fixed with a bolt, nut, and lock washer combination requiring tools. U.S. Pat. No. 4,901,970 teaches a fishing holder with a screw mounded bracket for attaching to a support pole that can be vertically adjusted by unscrewing the bracket, rotating it to a desired position and screwing the bracket together again. U.S. Pat. No. 5,560,137 teaches an environment-adaptable hands-free fishing rod holder assembly requiring tools to attach and detach from supports and having little vertical adjustability. U.S. D408,885 teaches a fishing rod cradle attached to a support with a clamp that is screw mounted, the cradle having no vertical adjustability. U.S. Pat. No. 6,409,131 teaches an easily re-positionable, quick attach and release, multiple purpose support system that attaches to a supporting structure with a push and a ¼ turn of its bracket element but has limited vertical adjustability by user. U.S. Pat. No. 6,588,362 teaches a fitted bracket for use on a boat and other structures and that can be used as a fishing rod holder comprising a first tee with a closed long cylinder to hold a rod, a second tee comprising a long lengthwise-cutout cylinder forming a press clamp, and a sleeve to join the two tees at their short cylinder with little stable vertical adjustability. U.S. D480,782 teaches a fishing rod holder that rotates about a screw-clamp fixture used to fasten the holder to a support cylinder, the holder having no vertical adjustability. U.S. Pat. No. 6,898,893 teaches a portable fishing pole holder with a clamp that fastens to a support cylinder and is tightened with a screw but no vertical adjustability. U.S. Pat. No. 7,047,688 teaches a fishing rod holder mount for recreational fishing boat chairs able to hold multiple fishing rod holders attached to setscrew-fixed short cylinders over rods of the mount fastened to the vertical post that mounts the chair to the boat but having no vertical adjustability without tools. U.S. Pat. No. 7,309,054 teaches screw-assembled universal clamp that can be attached to a support cylinder and can also be attached to a fishing rod holder where there is no vertical adjustability of the holder without disassembly and manual step-wise rotation to a desired setting before reassembly. U.S. Pat. No. 7,395,772 teaches screw-assembled universal clamp that can be attached to a support cylinder and can also be attached to a fishing rod holder where there is no vertical adjustability of the holder without manual rotation to a desired setting followed by setting position with a set-screw.

Group Two comprises references that show the use of PVC pipe/fittings in a fishing rod attachment bracket/support/holder but are complex, require multiple tools to attach and detach from a support or are not flexible in orientation.

None contains a snap clamp to attach the fishing rod holder to a support structure. Representative references include the following. U.S. Pat. No. 4,763,435 teaches a fishing rod holder on a self-supporting stand that is not designed to attach to supporting structures and has limited vertical adjustability. U.S. Pat. No. 5,533,295 teaches a fishing rod holder on a self-supporting stand that is not designed to attach to supporting structures and has limited vertical adjustability. U.S. D371,595 teaches a fishing rod holder mount for recreational fishing boat chairs able to hold a fishing rod holders attached to setscrew-fixed short cylinder fastened to the vertical post that mounts the chair to the boat but having no stable vertical adjustability. U.S. D507,817 teaches two fishing rod holders on a self-supporting stand that is not designed to attach to supporting structures and has limited vertical adjustability U.S. Pat. No. 7,765,732 Fishing rod support attached to a pad to permit more leverage by a person holding the rod, the holder that is not designed to attach to supporting structures and has having no vertical adjustability.

Group Three comprises references that show a lawn/folding chair and an attachment bracket/support/holder of some type but requires multiple tools to attach and detach from a support or is not flexible in orientation. None contains a snap clamp to attach the fishing rod holder to a support structure. Representative references include the following. U.S. Pat. No. 3,077,327 teaches a folding chair with a wire fishing holder and tackle box affixed with screws to the chair leg and the holder having no vertical adjustability. U.S. Pat. No. 4,835,896 teaches a lawn chair fish fighter comprising a fishing rod holder pivotally hooked to the horizontal seat of a lawn chair so a user can apply leverage on the rod during the reeling-in of a fish, where the holder has no vertical adjustability. U.S. Pat. No. 5,063,701 teaches a complex fishing rod holding attachment for collapsible chair where the holder is attached to a leg of the chair with a clasping bracket a d raised above ground with a pedestal such that there is limited adjustability with a pedestal comprising two rods where one is slideably joined to the holder. U.S. Pat. No. 5,325,620 teaches fishing pole support attached to the vertical support of a lawn chair with a split cylinder sleeve attached with screws by use of tools and angled to receive a fishing rod laid upon it with one end upon the ground next the chair, and where the holder has no vertical adjustability. U.S. Pat. No. 5,356,107 teaches a beverage container holder attachable to a lawn chair vertical leg with a deformable sleeve-shaped hollow cylindrical clamping member and no vertical adjustability. U.S. Pat. No. 5,557,876 teaches a single piece fishing rod holder that can be placed around a vertical support structure that has a free end and holds a fishing rod with no vertical adjustability. U.S. Pat. No. 5,865,124 teaches a table attachment for lawn chairs that is held to the chair by a bend cylinder attached to the vertical chair support with two hollow half cylinders that snap together, the table having no vertical adjustability. U.S. Pat. No. 5,899,527 teaches a fisherman's chair system comprising a cylindrical fishing rod holder with a forward set-screw and threaded clamp for securing the rod to the holder where the holder is attached with a tool-tightened hinge to a vertical post that is fix-mounted to the arm of the chair. U.S. Pat. No. 6,042,180 teaches a folding chair with fishing accessories including a tubular fishing rod holder joined to the leg of the chair with an extending member but having no vertical adjustability. U.S. Pat. No. 7,320,196 teaches a one-piece fishing rod holder having a mounting slot connected to locking groves to fit around the support rod but not having any vertical adjustability.

All of the above references lack the meaningful combination of our invention. They either lack vertical adjustability, easy attachment to and detachment from cylindrical support structures without use of tools or easy attachment to flat support structures, or stable positioning when desired vertical alignment is achieved.

I have invented a flexible general purpose holder apparatus that is easily attached to and detached from supporting cylinders with the flick of a wrist and without the use of tools, or to a flat section of support with a only a screwdriver. In addition, it can be adjusted in an angle of up to 90 degrees in a stable manner about a first line perpendicular to the length of the support member and a point that is perpendicular to the first line. The apparatus aspect comprises a holding element, a connecting rod, a joining element, a first attaching element, and an effective length.

The holding element is configured to hold various objects that are commonly used in such outdoor activities as, for example, fishing, camping, and picnicking. The holding elements can be of any rigid material suitable for holding the desired objects and include metal, plastic, and combinations of metal and plastic. Several embodiments are discussed here as examples of possible variations. These embodiments included a beverage holder, a hook, a light holder, rattle fishing reel, and a snap clamp head. The beverage holder may be in the form of a solid cup or bands having circular sides and horizontal bases suitable to hold a beverage in various containers such as, for example, a can or a bottle. The hook may be in various from such as, for example, closed with a pivoting catch or open, and suitable for holding anything that can be suspended such, for example, a coat, a handle of an object as diverse as a lantern or pail, or suspending items such as bags of food out of the reach of animals. The light holder is an enlarged flexible clamp for grasping a flashlight in a releasably manner to be used, for example, to illuminate an area for assembly of recreational equipment, preparation of food or reading. The rattle reel is a fishing reel with a moving object that makes a rattling noise when reel rotates as when a fishing line is pulled by a fish, and can be used for fishing in a confined space that does not accommodate a fishing pole. The snap clamp head, a second attaching element, is suitable for releasably holding items that contain cylinders such as umbrellas besides a lounge chair and some knapsacks in a tent, and will be discussed with an embodiment of the first attaching element.

The connecting rod has a length with a first longitudinal axis, a first diameter, and a first end with an enlarged second diameter. The rod is a rigid member and may be made of suitable materials such as wood, metal, plastic, or some combination of these materials. The rod may have any cross-section that resists bending of the longitudinal length and include, for example, a hollow circle, a solid circle, or an "X". It also has a second end adapted to be releasably affixed to the holding element in a stable rotatable manner about a second axis that is perpendicular to the first axis and passes through the point where the second end contacts the holding element. This affixing is achieved by use of a screw and nut arrangement similar to that shown in the following figures described below that permit stable rotation about the shaft of the screw that encompasses a line perpendicular to the length of the connecting rod.

The joining element has a first end and a second end. The first end has a female threaded opening. The second end is releasably and rotatably affixed to the first end of the connecting rod and has a hole that encompasses the first diameter of the connecting rod and not the enlarged second diameter of the first end of the connecting rod. The joining element can be made of metal, plastic, or some combination of both.

The first attaching element comprises a head configured to affix to a support member, a body, and a male threaded end configured to screwably affix to the female threaded opening of the first end of the joining element and with a rotatable connection point comprising a release surface affixed to the male threaded end to permit stable rotation of the connecting rod about its first axis of up to 90 degrees. The head can have two embodiments, a flat plate, and a snap clamp.

The flat plate head embodiment may be attached to a flat section of a support for long term positioning with a screw or mechanical fastener. Such a head would be beneficial in situations where the support structure would be in use by an individual for a long period of time such as a winter for an ice house and the supports are wood with at least one flat surface where the attachment is desired.

The snap clamp head embodiment element comprises a snap clamp head, a body having a length and an outer surface, and a threaded outer end. The snap clamp head has a width and a curvature adapted to attach in a releasable manner around a cylindrical support member without the use of screws or tools. The opening of the snap clamp head may extend outward from the longitudinal length of the body and threaded male end first attaching element. In some embodiments the opening is at right angles of the longitudinal length. In some embodiments the opening is between the outward position and the right angle position. The snap clamp head may be adapted to releasably adhere to a cross-section that has any shape such as, for example, a cylinder, a square or a polygon as long as the circumference of the support member is similar to the inside diameter of the snap clamp element. In this manner, the curvature extends more than 50 percent and less than 75 percent around the cross-section of the support member at point of attachment. Also, the snap clamp head is constructed with appropriate materials and dimensions to offer some resiliency to permit a firm grasp of the support member when pressed against it to cause an attachment. Some embodiments have heads that are designed to securely and releasably be attached with a flick of a wrist to a support with a standard outside diameter.

The support member for the snap clamp head embodiment is any member that is securely in contact with the ground and is used in the activity of fishing, camping of sitting. This includes, for example, the frames of chairs that are sat upon, ice fishing structures on frozen lakes, ponds, or rivers, tent poles of tents that are pitched outdoors. Although the support member can have any cross-section as discussed above, typically the support member is cylindrical and secularly in contact with the ground.

Using a cylinder shape as an example of a support member, a suitable snap clamp head embodiment for this example comprise an adapted curvature having short partially opened cylinder having a cylinder length, also known as the snap clamp width, an inside diameter and a circumference with a closed portion and an open portion. The length is similar in dimension to the diameter. The closed portion of the circumference is more than the open portion of the circumference. In some embodiments, the ends of the closed portion flare outward to assist connection of the snap clamp head to the support member and permit use of more rigid materials. In addition, the material is flexible such that the snap clamp head opens when pressed against the cylinder support member having an outside diameter similar to the open diameter of the snap clamp head. In this manner, the snap clamp head opens until it allows the support member to enter, and then securely encloses the support member with sufficient force to hold the snap clamp stationary during use. Materials having suitable strength and flexibility are plastics such as, for example, nylon and poly vinyl chloride. In some embodiments, the length and inside diameter are both about 0.75 inches, suitable for adhering to 0.75-inch diameter support cylinders. In some embodiments the length and open diameter are about 0.63 inch, suitable for adhering to 0.63-inch diameter support cylinders. In some embodiments the length and open diameter are about 0.5 inch, suitable for adhering to 0.5-inch diameter support cylinders. In some embodiments the length and open diameter are about 0.38 inch, suitable for adhering to 0.38-inch diameter support cylinders. In some embodiments, the width is about the same as the inside diameter.

The body of the first attaching element serves one purpose. It provides sufficient strength to the head to permit a secure attachment of the first attaching element to the support member under conditions of use. This is typically satisfied with a length of between 0.25 inch and 0.50 inch.

The same element as the snap clamp head of the first attaching element as described above may also be used as a holding element as briefly mentioned when discussing the holding element above.

The effective length is the length that extends from a point where the first end of the connecting rod enters the second end of the joining element to the point where the second end of the connecting rod contacts the holding element. The effective length must be long enough to permit unrestricted use of the hold element and short enough to prevent the head from tearing loose from the support surface during use of the apparatus. For the snap head embodiment, the effective length is at least 1.5 inches and not more than 5 inches. This would permit stable attachment for a downward pull of at least pounds from the holding element end of the apparatus. In some embodiments, the effective length is at least 2 inches and less than 3.5 inches and the downward pull can be more. For the plate head embodiment, the effective length is at least 1.5 inches and not more than 12 inches.

A first rotatable connection point is the point where the connecting rod can rotate up to 90 degrees about the first axis and hold its position in a stable manner. This is achieved by screwing the male end of the first attaching element into the female end of the joining element until it contacts the enlarged diameter end of the connecting rod with sufficient pressure to achieve stable positioning. When plastic elements of similar materials are screwed together firmly, they commonly form an attraction that results in the elements being difficult to separate them by unscrewing them. Alternatively, if the elements are not firmly screwed together, they tend to rotate easily and not hold a stable position. To solve this dilemma, some embodiments of the apparatus use a release surface affixed to the male threaded end to permit stable rotation of up to 90 degrees about the axis of the short cylinder. The surface has a surface tension less than that of the material of the threaded elements. In addition, optionally, it has some thickness to increase the adherence of the male and female surfaces under rotation. The thickness is typically on the order of between 0.001 and 0.010 inches (25 to 250 microns) but may be higher or lower depending on conditions and materials.

The release surface may have various forms. Some embodiments are adhesive tape having a high release backing such as, for example, TEFLON or silicone applied under a stretching force over the male threads to allow the thread contour to show. Some embodiments are low adhesion back size coatings known to the art of adhesive tapes.

Use of the release surface permits stable pressure on the enlarged diameter end to permit stable rotation of the connecting rod about the first axis of up to 90 degrees to achieve a desired location of the holding element relative to the ground. The new position is stable under the pulling force of at least two pounds downward force at the having a weight of at least two pounds. For some embodiments, the position is stable for a load of at least three pounds.

The second rotation connection, the connection between the second end of the connecting rod and the holding element, is obtained with a screw and nut combination. The tightness of the connection is adjusted to achieve a stable rotation about the second axis passing perpendicular to the first axis through the point of connection of up to 90 degrees.

Typically the first attaching element can be attached to the support member in any position about is long axis. Typically support members have an arc of at least 180 degrees about its long axis of space that is substantially free of obstructions. As an example, the support member on the side of a chair has free space along the outside of the chair. Similarly the support member in an ice house has an unobstructed space away from the ice house covering.

The positioning of the holding element of my invention is much more flexible than others currently known. When the 180 degree rotation about the long axis of the support member is combined with the 90 degree rotation about the first axis of the connecting rod with the 90 degree rotation about the second axis perpendicular to the first axis, the position and orientation of the general purpose holding apparatus can be placed in a stable position at virtually any orientation relative to a ground plane.

Figure 1B:
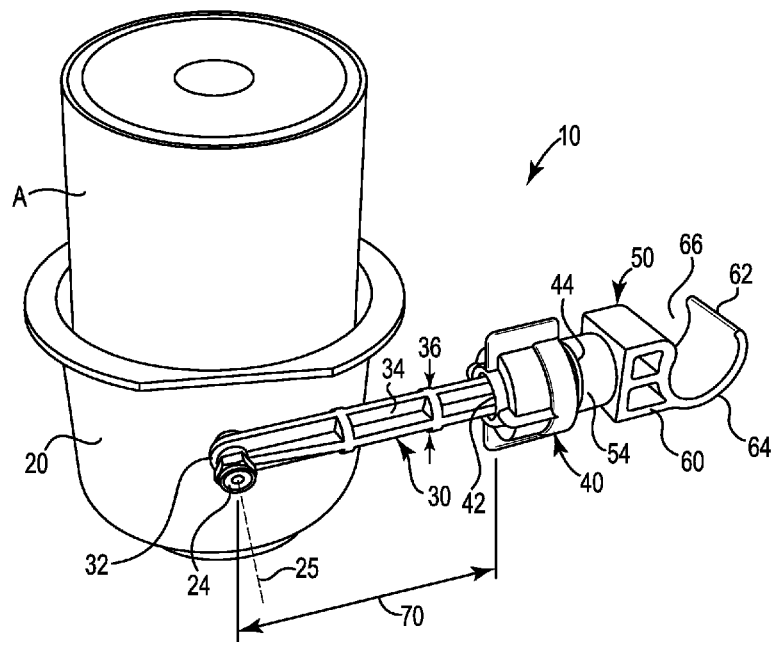

Five embodiments of a general purpose holder apparatus are shown in FIGS. 1 to 5. The same numbers are used to designate similar elements. FIG. 1 is an illustration of one embodiment of the invention with a cup holder with (A) depicting an exploded perspective view and (B) depicting an assembled perspective view. A general purpose holding apparatus (10) comprises a holding element (20), a solid cup holder, holding a pop can (A). Holding element 20 is rotatably affixed to a connecting rod (30) having a first axis (31) and connected at the second end (32) of connecting rod 30 through second axis (25) with a combination of a screw (22), a first nut (23), and a second nut (24). A shaft (34) of connecting rod 30 with a diameter (36) is inserted into the first end (42) of joining element (40) and held there by an enlarged diameter (38) of a first end (39) of connecting rod 30. Female threads (44) of second end 40 are engaged with male threads (52) of first attaching element (50) also having a body (54) and a head (60), a snap clamp head, comprising a width (62), a curvature (64), and an opening (66) sufficient to removably attach to a support surface (B) without use of tools. An effective length (70) extends from where holding element 20 contacts connecting rod 30 to where connecting rod 30 enters joining element 40.

Figure 2A:
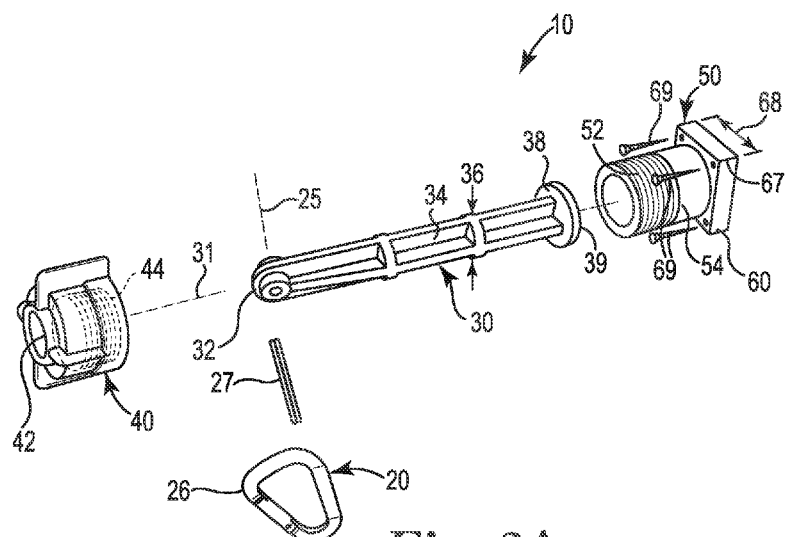
FIG. 2 is an illustration of another embodiment of the invention with a hook and an affixing head with (A) depicting an exploded perspective view and (B) depicting an assembled perspective view.
Figure 2B:
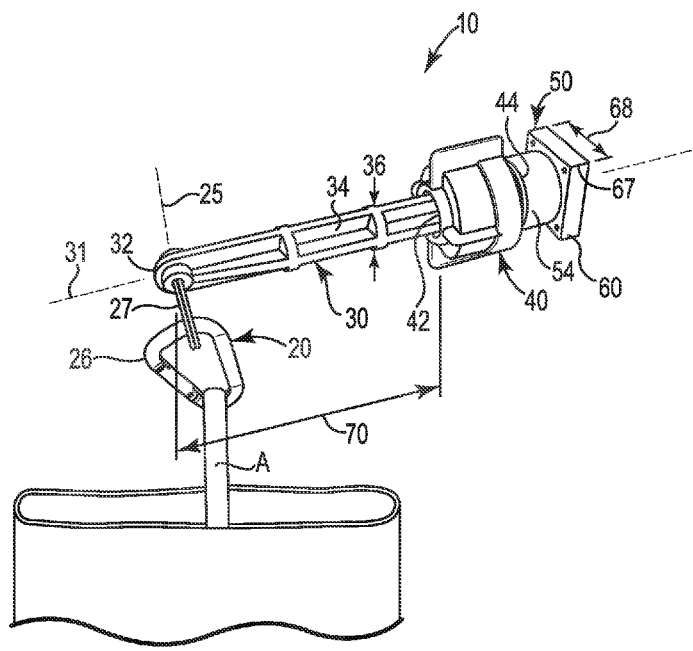

FIG. 2 is an illustration of another embodiment of the invention with a hook and an affixing head with (A) depicting an exploded perspective view and (B) depicting an assembled perspective view. A general purpose holding apparatus (10) comprises a holding element (20), a hook with a clasp (26) and a key chain connecting ring (27), holding a bag with a handle (A). Holding element 20 is rotatably affixed to a connecting rod (30) having a first axis (31) and connected at the second end (32) of connecting rod 30 through second axis (25) where connecting rod 30 joins key chain connecting ring 27. A shaft (34) of connecting rod 30 with a diameter (36) is inserted into the first end (42) of joining element (40) and held there by an enlarged diameter (38) of a first end (39) of connecting rod 30. Female threads (44) of second end 40 are engaged with male threads (52) of first attaching element (50) also having a body (54) and a head (60), a plate head, comprising a width (67), a length (68), and an affixing screws (69) sufficient to removably attach to a support surface (B) with use of tools. An effective length (70) extends from where holding element 20 contacts connecting rod 30 to where connecting rod 30 enters joining element 40. Use of a plate head permits heavier loads such as meat and other food in a bag off the ground.

Figure 3A:
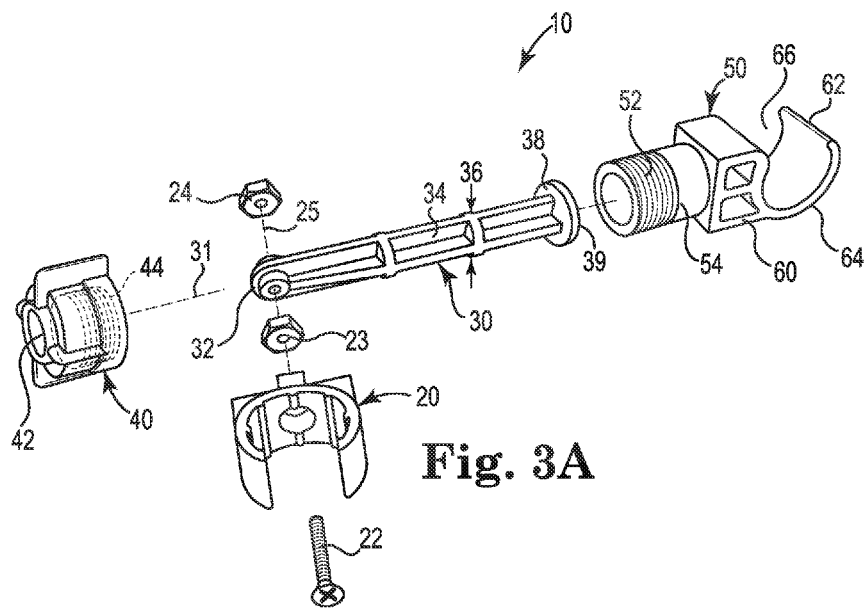
FIG. 3 is an illustration of another embodiment of the invention with a light holder with (A) depicting an exploded perspective view and (B) depicting an assembled perspective view.
Figure 3B:
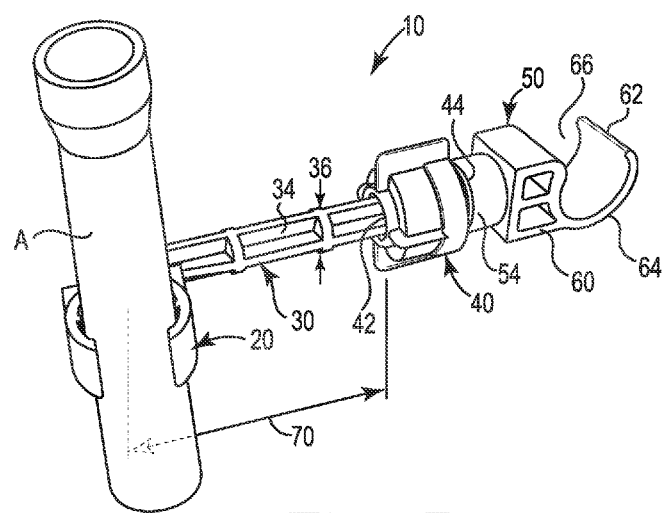

FIG. 3 is an illustration of another embodiment of the invention with a light holder with (A) depicting an exploded perspective view and (B) depicting an assembled perspective view. A general purpose holding apparatus (10) comprises a holding element (20), a light holder, holding a 1 inch diameter flashlight (A). Holding element 20 is rotatably affixed to a connecting rod (30) having a first axis (31) and connected at the second end (32) of connecting rod 30 through second axis (25) with a combination of a screw (22), a first nut (23), and a second nut (24). A shaft (34) of connecting rod 30 with a diameter (36) is inserted into the first end (42) of joining element (40) and held there by an enlarged diameter (38) of a first end (39) of connecting rod 30. Female threads (44) of second end 40 are engaged with male threads (52) of first attaching element (50) also having a body (54) and a head (60), a snap clamp head, comprising a width (62), a curvature (64), and an opening (66) sufficient to removably attach to a support surface (B) without use of tools. An effective length (70) extends from where holding element 20 contacts connecting rod 30 to where connecting rod 30 enters joining element 40.

Figure 4A:
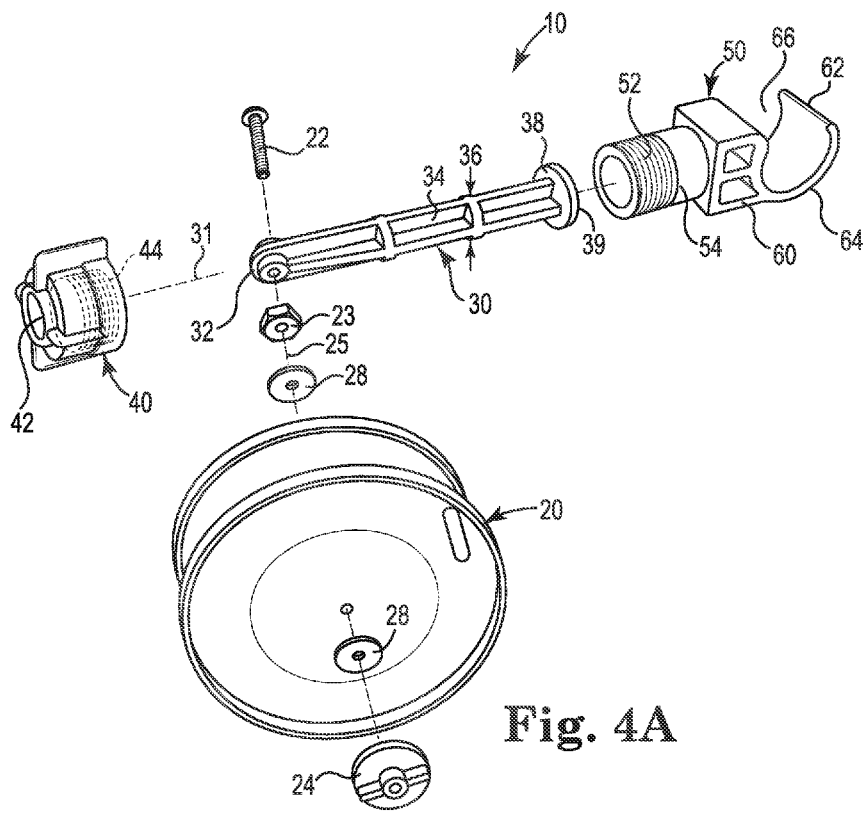
FIG. 4 is an illustration of another embodiment of the invention with a rattle fishing reel with (A) depicting an exploded perspective view and (B) depicting an assembled perspective view.
Figure 4B:
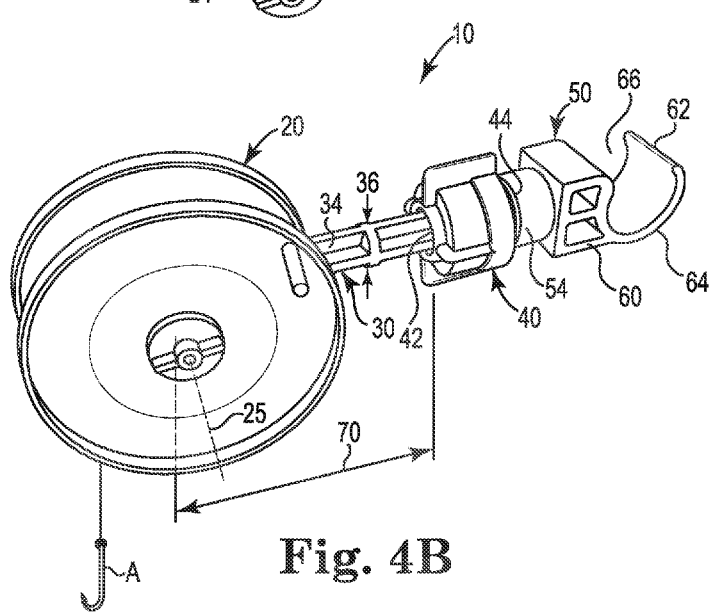

FIG. 4 is an illustration of another embodiment of the invention with a rattle fishing reel with (A) depicting an exploded perspective view and (B) depicting an assembled perspective view. A general purpose holding apparatus (10) comprises a holding element (20), a rattle reel, holding a fishing line with fishing hook (A). Holding element 20 is rotatably affixed to a connecting rod (30) having a first axis (31) and connected at the second end (32) of connecting rod 30 through second axis (25) with a combination of a screw (22), a first nut (23), a second nut (24), and a pair of washers (28). A shaft (34) of connecting rod 30 with a diameter (36) is inserted into the first end (42) of joining element (40) and held there by an enlarged diameter (38) of a first end (39) of connecting rod 30. Female threads (44) of second end 40 are engaged with male threads (52) of first attaching element (50) also having a body (54) and a head (60), a snap clamp head, comprising a width (62), a curvature (64), and an opening (66) sufficient to removably attach to a support surface (B) without use of tools. An effective length (70) extends from where holding element 20 contacts connecting rod 30 to where connecting rod 30 enters joining element 40.

Figure 5A:
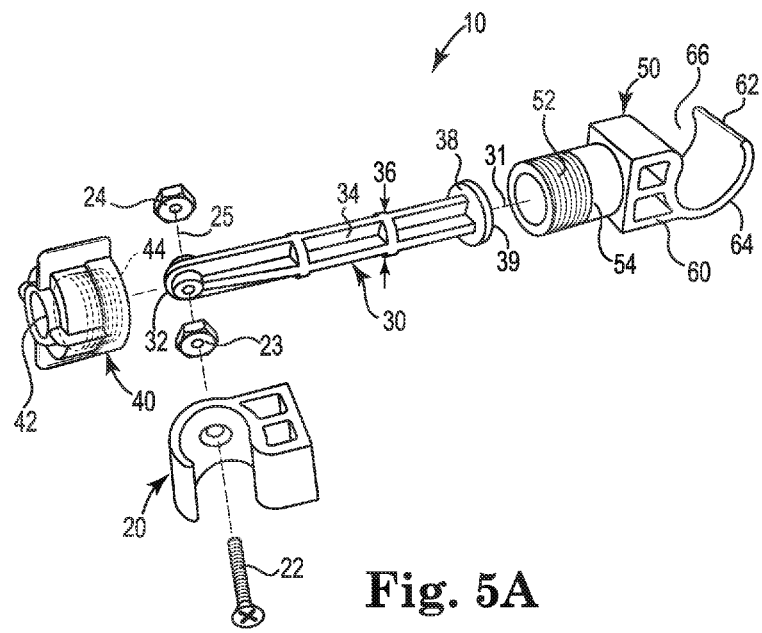
FIG. 5 is an illustration of another embodiment of the invention with a second snap clamp and an affixing head with (A) depicting an exploded perspective view and (B) depicting an assembled perspective view.
Figure 5B:
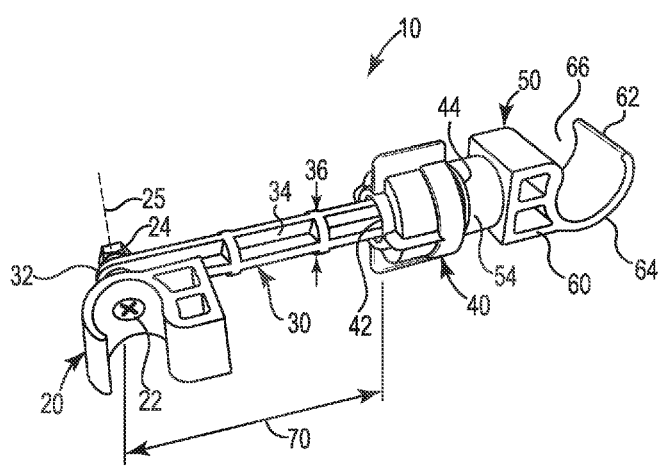
Figure 10:
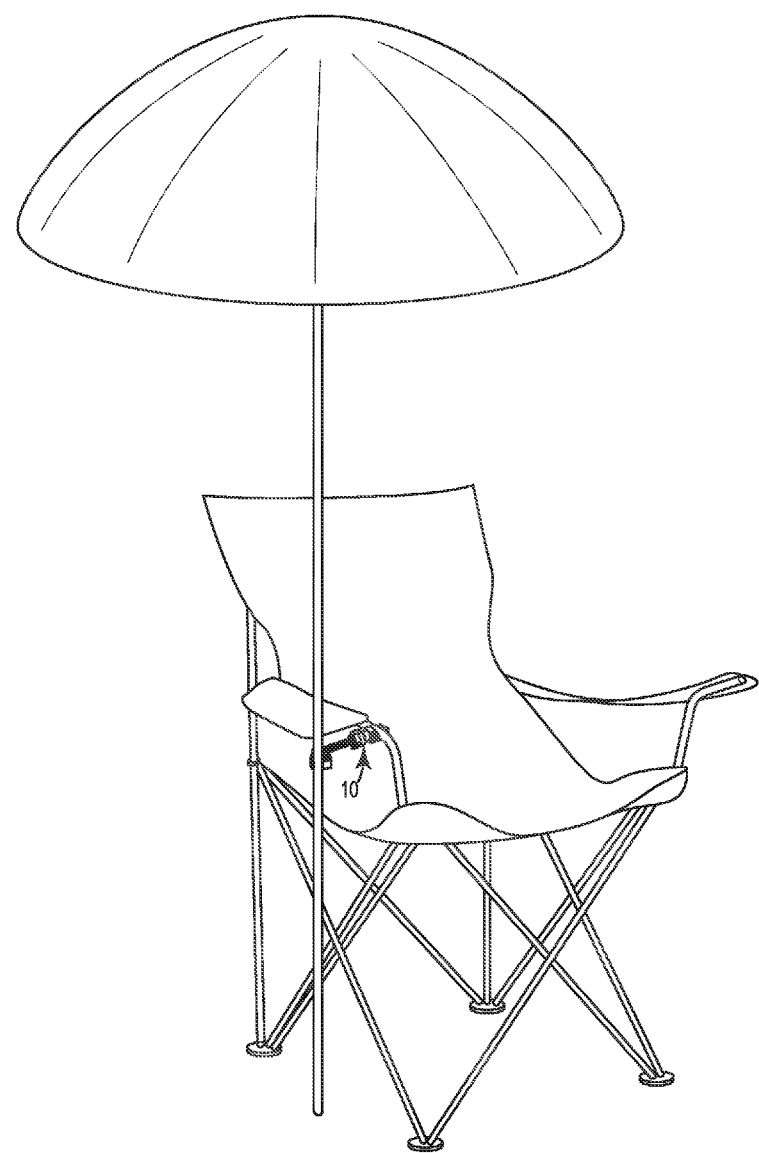
FIG. 10 is an illustration of the use of the embodiment of FIG. 5 attached to a vertically oriented support member of a chair and the pole of an umbrella.

FIG. 5 is an illustration of another embodiment of the invention with a second snap clamp and an affixing head with (A) depicting an exploded perspective view and (B) depicting an assembled perspective view. A general purpose holding apparatus (10) comprises a holding element (20), the second snap clamp, able to hold a shaft of an umbrella as shown in FIG. 10 but not here. Holding element 20 is rotatably affixed to a connecting rod (30) having a first axis (31) and connected at the second end (32) of connecting rod 30 through second axis (25) with a combination of a screw (22), a first nut (23), and a second nut (24). A shaft (34) of connecting rod 30 with a diameter (36) is inserted into the first end (42) of joining element (40) and held there by an enlarged diameter (38) of a first end (39) of connecting rod 30. Female threads (44) of second end 40 are engaged with male threads (52) of first attaching element (50) also having a body (54) and a head (60), a snap clamp head, comprising a width (62), a curvature (64), and an opening (66) sufficient to removably attach to a support surface (B) without use of tools. An effective length (70) extends from where holding element 20 contacts connecting rod 30 to where connecting rod 30 enters joining element 40.

I have also invented a method of using an adjustable general purpose holder apparatus comprising at least five steps. The first step is providing a general purpose holder apparatus as described above. The second step is providing a support member. The third step is affixing the head to the support member. The fourth step is rotating the apparatus about the first axis and second axis to achieve a desired position of the holding element. The fifth step is using the holding element for its purpose of use by placing a desired object in the holder unless the holder already contains the object.

As taught above, the effective length of the general purpose holder apparatus is at least 1.5 inches and no more than 5.0 inches for embodiments with a snap clamp head and at least 1.5 inches and no more than 12.0 inches for embodiments with a plate head The method may comprise providing a general purpose clamp head that can be attached to a support without the use of tools and a general purpose plate head that can be attached to a support with the use of tools but can withstand greater downward forces on the holding element before the first attaching element is unable to remain affixed to the support surface.

My method is fast, simple, small and effective—all features greatly desired by people who enjoy outdoor recreational activities. In use, the snap clamp head is able to be attached to a support member by pressing the snap clamp element against the support member at a point where connection is desired. The plate head is able to be affixed to a flat portion of a support surface with screws or mechanical fasteners (the later requiring no use of tools). The connecting rod be rotated with pressure and the holding element may be similarly rotated with pressure in a different plane to the desired orientation. Then the object can inserted in the holding element and used as needed. When finished using the holder, the user can remove it from the support member with a simple twist of the wrist when using embodiments having snap clamps or flat plates affixed with mechanical fasteners. For longer term uses or those needing to withstand greater forces, such as with an umbrella on a folding chair or a hook on vertical supports, including trees, holding meat and other food above the ground, plate heads may be unscrewed when use is finished.

Figure 6:
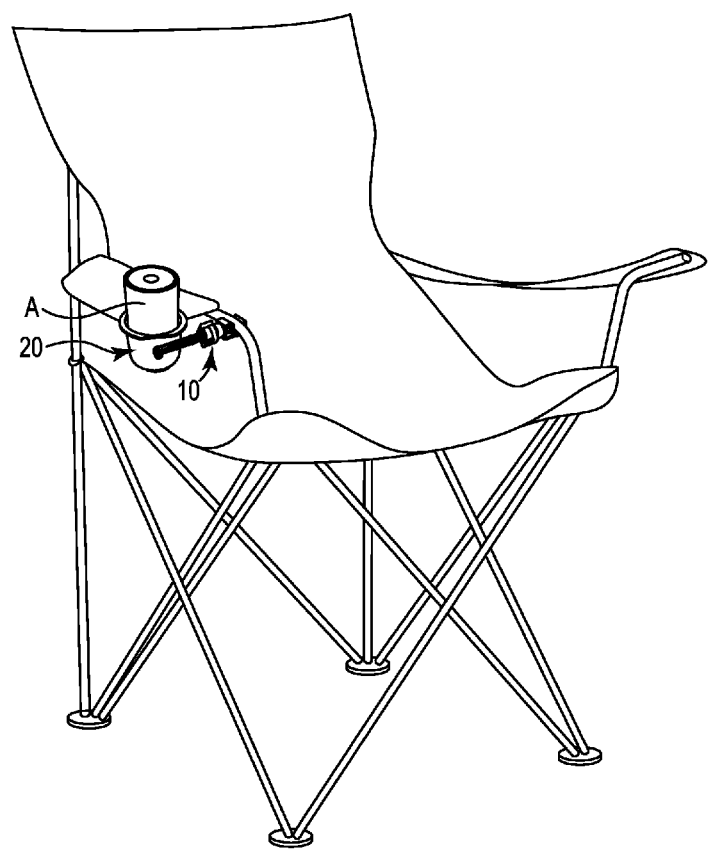
FIG. 6 is a view of the use of the embodiment of FIG. 1 with a folding chair.

FIGS. 6 to 9 illustrate various general purpose holders in use. FIG. 6 is a view of the use of the embodiment of FIG. 1 with a folding chair. As shown, the effective distance permits the beverage to be rotated freely to a desired orientation.

Figure 7:
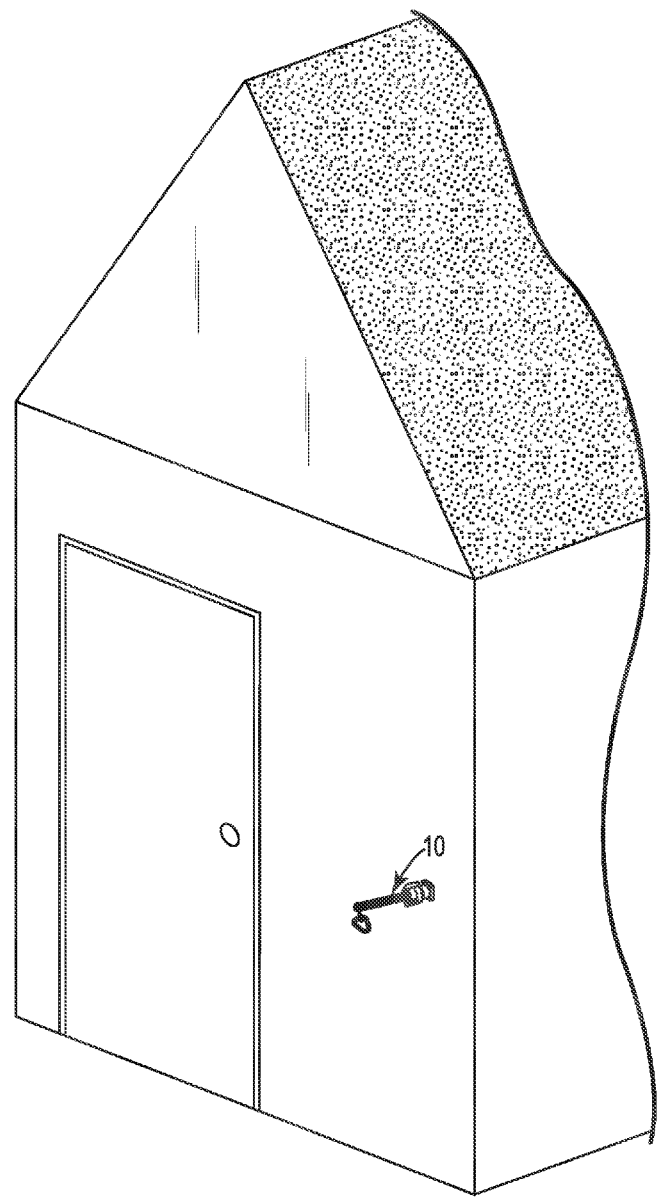
FIG. 7 is a view of the use of the embodiment of FIG. 2 with an ice house support.

FIG. 7 is a view of the use of the embodiment of FIG. 2 with a vertical ice house support. The plate head permits heavier loads such as meat and other food off the ground that allowed with the snap clamp head.

Figure 8:
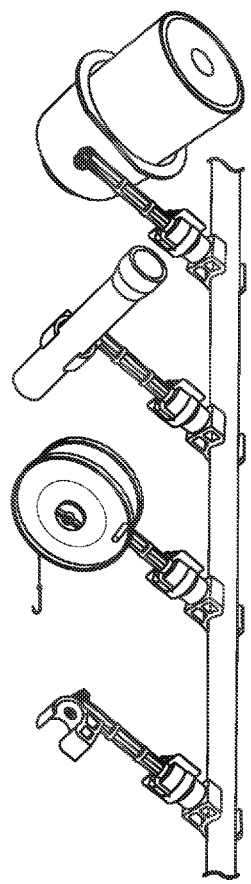
FIG. 8 is an illustration of the embodiments of FIGS. 1, 2, 3, and 4 attached to a vertically oriented support member.

FIG. 8 is an illustration of the embodiments of FIGS. 1, 3, 4, and 5 attached to a vertically oriented support member. As shown, multiple general purpose holders with different holder elements can be used on the same vertical support.

Figure 9:
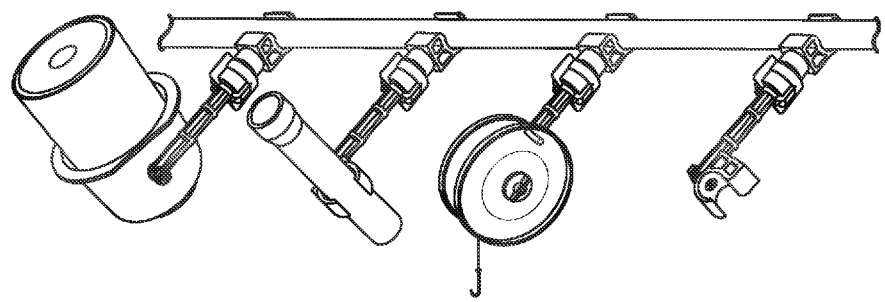
FIG. 9 is an illustration of the embodiments of FIGS. 1, 2, 3, and 4 attached to a horizontally oriented support member.

FIG. 9 is an illustration of the embodiments of FIGS. 1, 3, 4, and 5 attached to a horizontally oriented support member. As shown, multiple general purpose holders with different holder elements can be used on the same horizontal support.

FIG. 10 is an illustration of the use of the embodiment of FIG. 5 attached to a vertically oriented support member of a chair and the pole of an umbrella. As shown, the umbrella may be moved to a different location as the sun moves in the sky.

Figure 11:
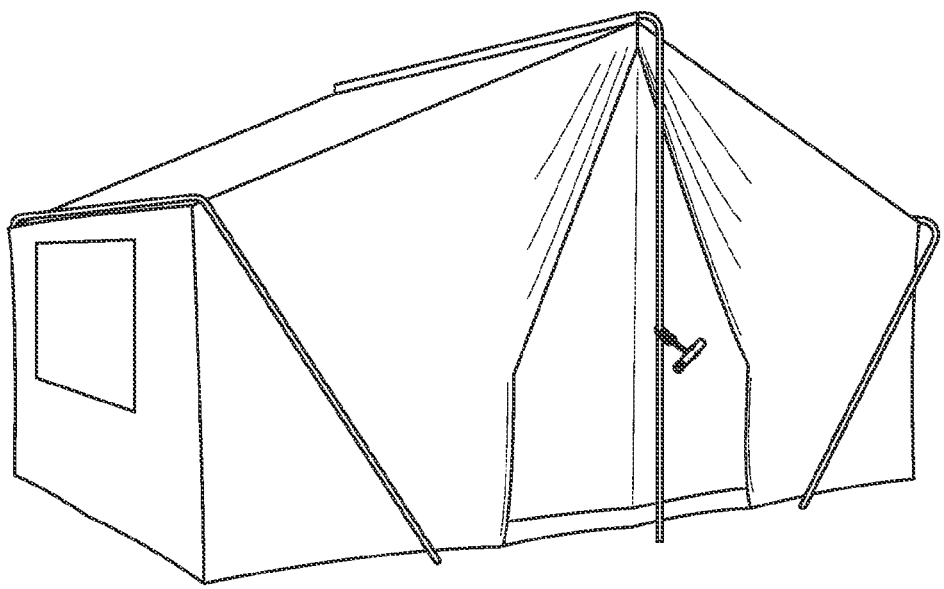
FIG. 11 is an illustration of the use of an embodiment of FIG. 5 and an embodiment of FIG. 3.

FIG. 11 is an illustration of the use of an embodiment of FIG. 5 and an embodiment of FIG. 3. The first attached to a vertically oriented support member of a tent and a second pole and the second attached to the pole and a flashlight. This permits further extension of the light from the vertical support member of the tent.

Other modifications and changes regarding my invention will be apparent to those skilled in the art. The invention is not considered limited to the embodiments chosen for purposes of disclosure and covers all changes and modifications that do not constitute departures from the true spirit and scope of this invention.

I claim:

1. A general purpose holder apparatus, comprising:
    a holding element;
    a connecting rod having a length with a first longitudinal axis, a first end with an enlarged second diameter, and a second end adapted to be releasably affixed to the holding element in a stable rotatable manner about a second axis that is perpendicular to the first axis and passed though the point where the second end contacts the holding element;
    a joining element with a first end comprising a female threaded opening and a second end releaseably and rotatably affixed to the first end of the connecting rod, the joining element comprising a hole that encompasses the first diameter of the connecting rod and not the enlarged second diameter of the first end of the connecting rod,
    wherein the joining element engages the connecting rod through the hole;
    an attaching element comprising a head and a body, the body having a male threaded end configured to screwably affix to the female threaded opening of the first end of the joining element, the joining element having a rotatable connection point comprising a release surface having a surface tension less than that of the material of the male threaded end of the attaching element, wherein the rotatable connection point, after rotation, will remain stable; and
    an effective length that extends from a point wherein the first end of the connecting rod engages the second end of the joining element to the point where the second end of the connecting rod contacts the holding element.

2. The apparatus of claim 1 wherein the head of the first attaching element comprises a snap clamp with a width and a curvature adapted to securely fit around a support member without the use of screws or tools.

3. The apparatus of claim 2 wherein the opening of the snap claim is suitable to detachably attach to a common support pole having an outside diameter from the group consisting of about 0.38 inch, of about 0.5 inch, or about 0.63 inch, and of about 0.75 inch.

4. The apparatus of claim 1 wherein the head of the first attaching element comprises a plate configured to be affixed with screws or mechanical fasteners to a flat support structure.

5. The apparatus of claim 1 wherein the holding element is selected from a group consisting of a can or bottle holder, a hook, a snap claim sized to hold a light, and a rattle reel.

6. The apparatus of claim 5 wherein the light has a diameter of about 1 inch.

7. The apparatus of claim 1 wherein the connecting rod can be rotated up to 90 degrees about the first axis and up to 90 degrees about the second axis and will remain stable under two pounds of pull that is perpendicular to each axis.

8. The apparatus of claim 1 wherein the connecting rod can be rotated up to 90 degrees about the first axis and up to 90 degrees about the second axis and will remain stable under normal use.

9. The apparatus of claim 1 wherein the effective length is at least 1 inch.

10. The apparatus of claim 2 wherein the effective length is no more than 5 inches.

11. The apparatus of claim 4 wherein the effective length is no more than 12 inches.

12. The apparatus of claim 1 wherein the second end of the connecting rod is releaseably affixed to the holding element with a screw.

13. The apparatus of claim 12 wherein the apparatus comprises plastic except for the screw.

14. The apparatus of claim 1 wherein the support cylinder comprises a support in a lawn chair, camping tent or ice-fishing house.

15. The apparatus of claim 1 wherein the release surface comprises a low adhesion back size.

16. The apparatus of claim 1 wherein the release surface comprises polyfluoroethylene adhesive tape.

17. A method of using a general purpose holder apparatus comprising:
   providing a general purpose holder apparatus comprising:
      a holding element;
      a connecting rod having a length with a first longitudinal axis, a first diameter, a first end with an enlarged second diameter, and a second end adapted to be releaseably affixed to the holding element in a stable rotatable manner about a second axis that is perpendicular to the first axis and passes through the point where the second end contacts the holding element;
      a joining element with a first end comprising a female threaded opening and a second end releaseably and rotatably affixed to the first end of the connecting rod, the joining rod comprising a hole that encompasses the first diameter of the connecting rod and not the enlarged second diameter of the first end of the connecting rod,
   wherein the joining element engages the connecting rod through the hole;
      an attaching element comprising a head, and a body, the body having a male threaded end configured to screwably affix to the female threaded opening of the first end of the joining element, the joining element having a rotatable connection point comprising a release surface having a surface tension less than that of the material of the male threaded end of the attaching element, wherein the rotatable connection point, after rotation, will remain; and
      an effective length that extends from a point wherein the first end of the connecting rod engages the second end of the joining element to the point where the second end of the connecting rod contacts the holding element;
   providing a support member;
   affixing the head to the support member;
   rotating the apparatus about the first axis and second axis to achieve a desired position of the holding element, and
   using the holding element for its intended purpose of use by placing a desired object in the holder.

18. The method of 17, wherein the head of the first attaching element comprises a snap clamp having a width and a curvature adapted to securely fit around a support member without the use of screws or tools.

19. The method of 17, wherein the head of the first attaching element comprises a plate configured to be affixed with screws or mechanical fasteners to a flat support structure.

\* \* \* \* \*